United States Patent
Zhao (10) Patent No.: US 10,754,218 B2
(45) Date of Patent: Aug. 25, 2020

(54) SUBSTRATE DETECTION DEVICE AND METHOD

(71) Applicants: BOE Technology Group Co., Ltd., Beijing (CN); Hefei Xinsheng Optoelectronics Technology Co., Ltd., Hefei (CN)

(72) Inventor: Tingting Zhao, Beijing (CN)

(73) Assignees: BOE TECHNOLOGY GROUP CO., LTD., Beijing (CN); HEFEI XINSHENG OPTOELECTRONICS TECHNOLOGY CO., LTD, Hefei (CN)

( * ) Notice: Subject to any disclaimer, the term of this patent is extended or adjusted under 35 U.S.C. 154(b) by 0 days.

(21) Appl. No.: 16/117,284

(22) Filed: Aug. 30, 2018

(65) Prior Publication Data

US 2019/0265529 A1    Aug. 29, 2019

(30) Foreign Application Priority Data

Feb. 28, 2018 (CN) .......................... 2018 1 0168066

(51) Int. Cl.
*G02F 1/139* (2006.01)
*G02F 1/1333* (2006.01)
*G02F 1/1335* (2006.01)

(52) U.S. Cl.
CPC ...... *G02F 1/1393* (2013.01); *G02F 1/133382* (2013.01); *G02F 1/133514* (2013.01); *G02F 2203/69* (2013.01)

(58) Field of Classification Search
CPC ............. G02F 1/133382; G02F 1/1393; G02F 2203/69; G02F 1/1309
See application file for complete search history.

(56) References Cited

U.S. PATENT DOCUMENTS

2007/0258029 A1*  11/2007  Nakagawa ........... G02B 5/3016
                                                          349/119
2011/0090502 A1    4/2011  Bai et al.
(Continued)

FOREIGN PATENT DOCUMENTS

CN          101369059 A       2/2009
CN          102023398 A       4/2011
(Continued)

OTHER PUBLICATIONS

First office action of Chinese application No. 201810168066.X dated Mar. 2, 2020.
(Continued)

*Primary Examiner* — Jessica M Merlin
(74) *Attorney, Agent, or Firm* — Fay Sharpe LLP (57) ABSTRACT

A substrate detection device and method are provided. The substrate detection device includes: a base platform; and a birefringence structure; the base platform comprising a light source and a bearing platform; the bearing platform being configured to place the substrate to be detected; the light source being configured to illuminate the substrate to be detected from one side, close to the bearing platform, of the substrate to be detected. The phase difference of the lights is increased by a birefringence structure layer, such that interfere may happen with some lights having a relatively smaller phase difference. The difference in brightness of different regions on the light-outgoing side of the birefringence structure layer increases, such that the non-uniformity on the substrate manifests more easily. Therefore, the effect of avoiding the missed detection is achieved.

18 Claims, 7 Drawing Sheets

(56) References Cited

U.S. PATENT DOCUMENTS

2014/0017444 A1* 1/2014 Shimizu .............. G02F 1/13439
428/131
2014/0368783 A1* 12/2014 Choi .................... G02F 1/1309
349/199
2019/0121191 A1* 4/2019 Hegyi ................... G01J 3/2823

FOREIGN PATENT DOCUMENTS

| CN | 102043266 A | | 5/2011 |
|---|---|---|---|
| EP | 1574895 A1 | | 9/2005 |
| JP | 2001059795 A | * | 3/2001 |

OTHER PUBLICATIONS

Wei Wang, "Study of Temperature Effect of Liquid Crystal Electronically Controlled Birefringence", "Chinese Doctoral Dissertations & Master's Thesis Full-text Database Engineering Science and Technology I Series", No. 1, pp. B014-387, Mar. 15, 2003.

* cited by examiner

SUBSTRATE DETECTION DEVICE AND METHOD

This application claims priority to the Chinese Patent Application No. 201810168066.X, filed with the State Intellectual Property Office on Feb. 28, 2018 and titled "SUBSTRATE DETECTION DEVICE AND METHOD", the disclosure of which is incorporated herein by reference in its entirety.

TECHNICAL FIELD

The present disclosure relates to a substrate detection device and method.

BACKGROUND

Various displays typically comprise various substrates for display control. The substrates may be detected before they are cell-aligned to other structures in the displays.

A substrate detection device comprises an illumination assembly and a base platform. The base platform is configured to place the substrate to be detected. The substrate to be detected is irradiated from one side of the substrate to be detected by the illumination assembly and observed from the other side by the detection personnel. If there are some non-uniform regions on the substrate to be detected, the phenomena, such as interference caused by the non-uniform regions, may make the brightness of lights passed through different regions of the substrate to be detected non-uniform. The substrate to be detected, which is with the phenomenon of non-uniform brightness (this phenomenon may be referred to as Mura phenomenon), is a defective substrate.

SUMMARY

The present disclosure provides a substrate detection device and method.

According to an aspect of the present disclosure, there is provided a substrate detection device, comprising:
a base platform; and a birefringence structure, wherein
the base platform comprises a light source and a bearing platform; the bearing platform is configured to place the substrate to be detected; the light source is configured to illuminate the substrate to be detected from one side, close to the bearing platform, of the substrate to be detected;
the birefringence structure is on one side, away from the bearing platform, of the substrate to be detected.

Optionally, the birefringence structure comprises a liquid crystal layer and an electric field assembly outside the liquid crystal layer, and
the electric field assembly is configured to control a birefringent index of the liquid crystal layer.

Optionally, the birefringence structure further comprises a temperature adjustment assembly which is configured to adjust the temperature of the liquid crystal layer.

Optionally, the temperature adjustment assembly comprises a transparent graphene heating film.

Optionally, the graphene heating film is attached to the liquid crystal layer.

Optionally, the birefringence structure further comprises a color film layer arranged on one side, away from the bearing platform, of the liquid crystal layer.

Optionally, the birefringence structure further comprises a first polaroid arranged on one side, away from the bearing platform, of the liquid crystal layer, and a second polaroid is arranged on the bearing platform; the light source is configured to illuminates the substrate to be detected through the second polaroid; the first polaroid and the second polaroid are configured to cooperated with the liquid crystal layer to adjust the transmittance of the birefringence structure.

Optionally, the light source is an area light source.

Optionally, the area light source is arranged on the bearing platform; the second polaroid is arranged on a light-outgoing side of the area light source, and the substrate to be detected is placed on one side, away from the area light source, of the second polaroid.

Optionally, the bearing platform comprises a supporting portion and an opening portion, the supporting portion being configured to support the substrate to be detected; the opening portion being configured to allow a light emitted from the light source to illuminate the substrate to be detected through the bearing platform.

Optionally, the supporting portion comprises a plurality of supporting rods.

Optionally, the substrate detection device further comprises a transparent substrate, and the transparent substrate is arranged on one near side, to the base platform, of the birefringence structure.

Optionally, the substrate detection device further comprises an image acquisition assembly, the image acquisition assembly being arranged on one side, away from the base platform, of the birefringence structure.

According to another aspect of the present disclosure, there is provided a substrate detection method for a substrate detection device, wherein the substrate detection device comprises a base platform and a birefringence structure, the base platform comprising a light source and a bearing platform; the bearing platform being configured to place the substrate to be detected; the light source being configured to illuminate the substrate to be detected from one near side, to the bearing platform, of the substrate to be detected; the birefringence structure being located on one side, away from the bearing platform, of the substrate to be detected; the method comprising the following steps:
placing the substrate to be detected on the bearing platform; and
turning on the light source; and
determining whether the substrate to be detected is eligible according to image(s) displayed on one side, away from the bearing platform, of the birefringence structure.

Optionally, the birefringence structure comprises a liquid crystal layer and an electric field assembly, and said determining whether the substrate to be detected is eligible according to the image(s) displayed on one side, away from the bearing platform, of the birefringence structure comprises:
adjusting a birefringent index of the liquid crystal layer by the electric field assembly; and
determining whether the substrate to be detected is eligible according to images displayed on one side, away from the bearing platform, of the birefringence structure in the case of different birefringent indexes.

Optionally, the birefringence structure further comprises a temperature adjustment assembly, and said adjusting the birefringent index of the liquid crystal layer by the electric field assembly comprises: adjusting the birefringent index of the liquid crystal layer by the electric field assembly and the temperature adjustment assembly.

Optionally, the birefringence structure further comprises a first polaroid arranged on one side, away from the bearing platform, of the liquid crystal layer; a second polaroid is arranged on the bearing platform; the light source is configured to illuminate the substrate to be detected through the second polaroid; and the method further comprises: controlling, by the electric field assembly, a degree of deflection of a liquid crystal in the liquid crystal layer to adjust the transmittance of the birefringence structure; and said determining whether the substrate to be detected is eligible according to the images displayed on one side, away from the bearing platform, of the birefringence structure in the case of different birefringent indexes comprises: determining whether the substrate to be detected is eligible according to images displayed on one side, away from the bearing platform, of the birefringence structure in the case of different birefringent indexes and different transmittances.

Optionally, the substrate detection device further comprises an image acquisition assembly, the image acquisition assembly being arranged on one side, away from the base platform, of the birefringence structure, and after turning on the light source, the method further comprises: acquiring, by the image acquisition assembly, image(s) displayed on one side, away from the bearing platform, of the birefringence structure.

Optionally, said determining whether the substrate to be detected is eligible according to the image(s) displayed on one side, away from the bearing platform, of the birefringence structure comprises: determining whether the substrate to be detected is eligible according to a uniformity level of the image displayed on one side, away from the bearing platform, of the birefringence structure.

Optionally, said determining whether the substrate to be detected is eligible according to the uniformity level of the images displayed on one side, away from the bearing platform, of the birefringence structure comprises: determining a magnitude relationship between a specified value and a variance of a gray level of pixel point(s) in the image(s) displayed on one side, away from the bearing platform, of the birefringence structure; determining that the substrate to be detected is non-eligible when the variance is greater than or equal to the specified value; and determining that the substrate to be detected is eligible when the variance is less than the specified value.

DETAILED DESCRIPTION

The embodiments of the present disclosure will be described in further detail with reference to the enclosed drawings, to clearly present the principles and advantages of the present disclosure.

Various display panels, such as a passive matrix liquid crystal display (PM-LCD), an active matrix liquid crystal display (AM-LCD), a passive matrix organic light-emitting diode (PM-OLED) display panel and an active matrix organic light-emitting diode (AM-OLED) display panel, and so on comprise various substrates respectively. For example, the PM-LCD and the AM-LCD comprise an array substrate and a color film substrate, and the PM-OLED and the AM-OLED comprise an array substrate. In order to reduce the probability of defects detected in a display panel after cell alignment of the substrate, the substrate is usually detected before the cell alignment of the substrate. This detection is used to detect whether the uniformity level of the substrate meets the criterion.

The detection principle may include: when the substrate is irradiated with lights of uniform brightness, the uniformity level of the substrate is positively correlated with the uniformity of the lights passed through the substrate. That is, the more uniform the substrate is, the higher the uniformity of the lights passed through the substrate is. The more non-uniform the substrate is, the lower the uniformity of the lights passed through the substrate is. This is because the more non-uniform the substrate is, the more non-uniform a segment gap and a slope angle on the surface of the substrate are. These non-uniform positions may cause interference of lights, such that the intensity of the lights passed through the substrate is non-uniform. However, it is generally difficult to determine whether the lights passed through the substrate are uniform, which makes it more likely to miss the defective substrate.

According to the substrate detection device and method provided by embodiments of the present disclosure, the possibility of missed detection of the defective substrate may be reduced.

Figure 1:
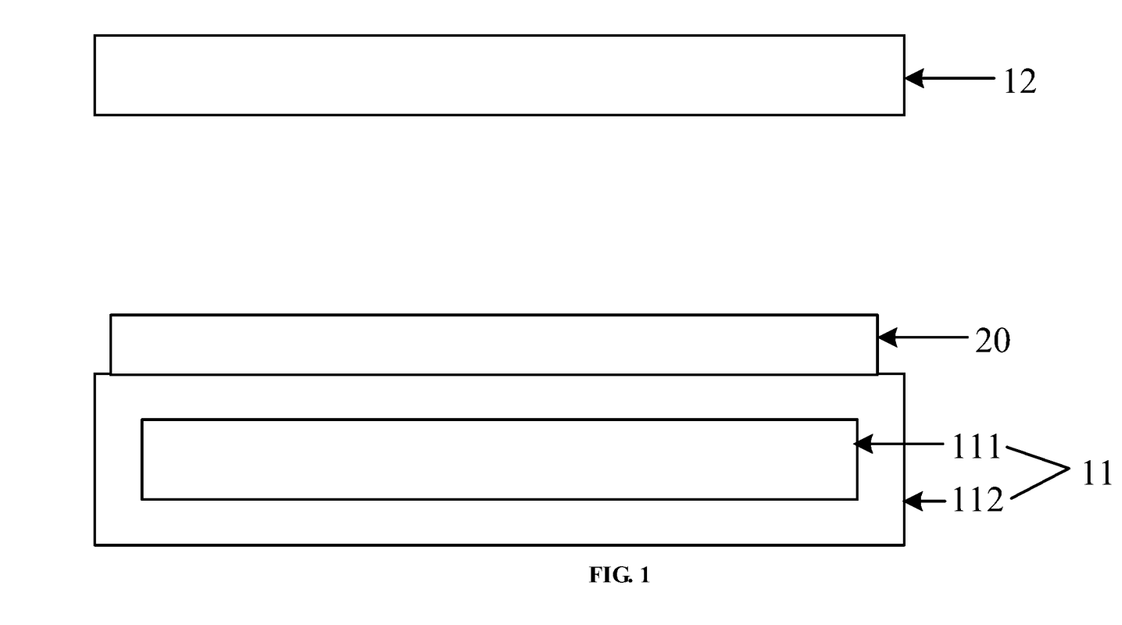
FIG. 1 is a schematic diagram of a structure of a substrate detection device according to an embodiment of the present disclosure.

FIG. 1 is a schematic diagram of a structure of a substrate detection device illustrated in an embodiment of the present disclosure. The substrate detection device 10 may comprise a base platform 11 and a birefringence structure 12.

The base platform 11 comprises a light source 111 and a bearing platform 112. The bearing platform 112 is configured to place the substrate 20. The light source 111 is configured to illuminate the substrate 20 to be detected from one side close to the bearing platform 112, of the substrate 20 to be detected.

The birefringence structure 12 is located on one side, away from the bearing platform 112, of the substrate 20 to be detected, and the light source 111 and the bearing platform 112 are located on the same side of the birefringence structure 12. The birefringence structure 12 may enlarge a phase difference of lights that illuminate the birefringence structure 12 through the substrate to be detected based on a birefringence phenomenon.

In FIG. 1, the substrate 20 to be detected may be shown for convenience of explanation, and may not be necessarily included in the substrate detection device 10 shown in FIG. 1.

The birefringence phenomenon refers to a phenomenon in which one incident light generates two refracted lights. When birefringence phenomenon appears to the two lights with a phase difference, the phase difference between the two lights will increase.

In summary, according to the substrate detection device provided by the embodiment of the present disclosure, the phase difference of the lights is increased by a birefringence structure layer, such that interfere may happens with some lights having a relatively small phase difference. The difference in brightness of different regions on the light-outgoing side of the birefringence structure layer is increased, such that the non-uniformity on the substrate is manifested more easily. The problem that the Mura phenomenon on some substrates to be detected is difficult to observe in the related art, resulting in large possibility of missed detection, is solved. Therefore, the effect of avoiding the missed detection is achieved.

Figure 2:
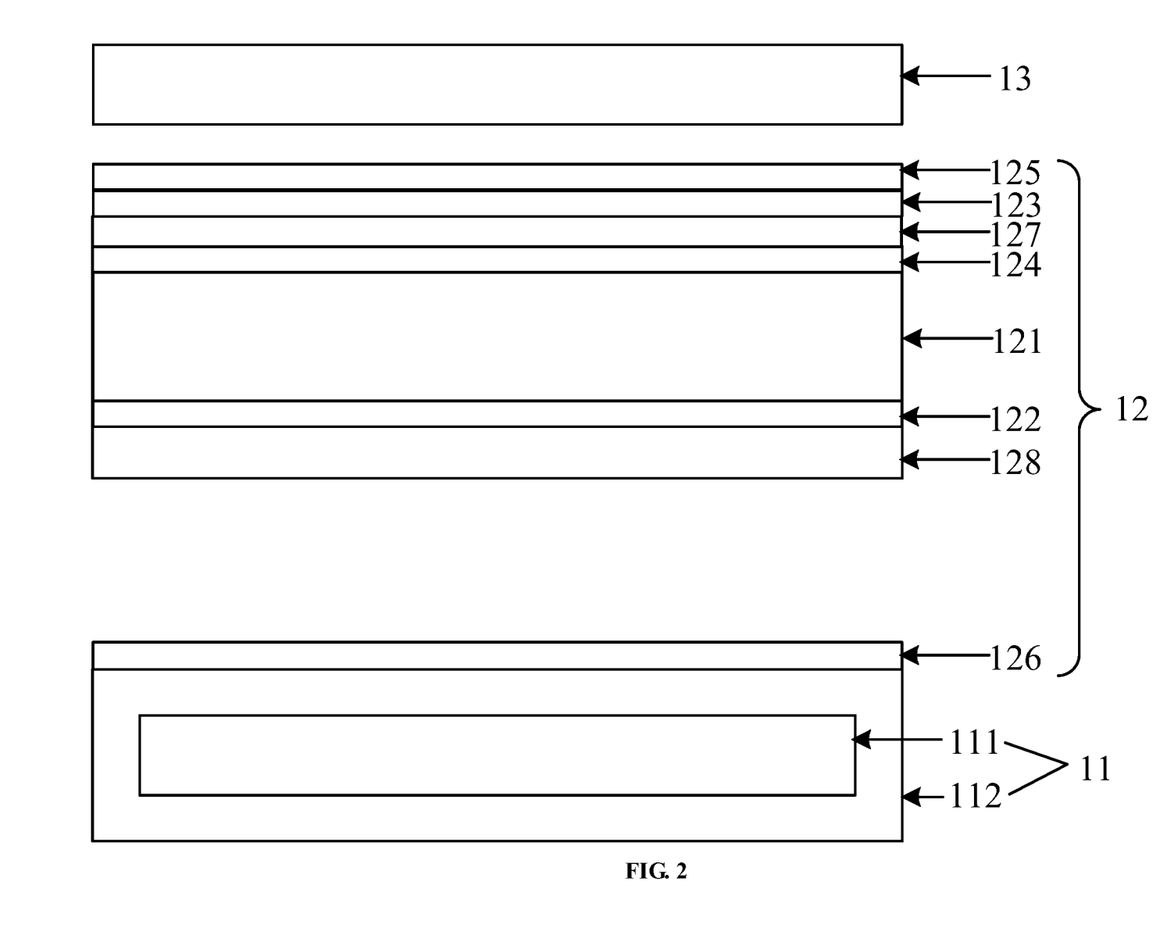
FIG. 2 shows another substrate detection device according to an embodiment of the present disclosure.

FIG. 2 is another substrate detection device provided by an embodiment of the present disclosure. The substrate detection device is adjusted on the base of the substrate detection device shown in FIG. 1.

Optionally, the birefringence structure 12 comprises a liquid crystal layer 121 and an electric field assembly 122 arranged outside the liquid crystal layer 121. The electric field assembly 122 is configured to control a birefringent index of the liquid crystal layer 121.

In the two lights generated by the birefringence phenomenon, one light obeys a refraction law, which is called ordinary light (referred to as O-light). The other light is not refracted according to the refraction law, which is called extraordinary light (referred to as E-light). The difference between refractive indexes of the two lights is the birefringent index. The larger the birefringent index is, the greater the effect of the birefringence phenomenon on the increase of an optical path difference is.

The electrically controlled birefringence structure can be comprised by the liquid crystal layer 121 and the electric field assembly 122 disposed outside the liquid crystal layer 121. The electric field assembly 122 can generate an electric field in the liquid crystal layer 121. The electrically controlled birefringence structure may control the magnitude of the birefringent index of the liquid crystal layer through the electric field. Herein, the electric field assembly 22 may be located on both sides of the liquid crystal layer 121 or on one side of the liquid crystal layer 121. In addition, the structure of the electric field assembly may also refer to a structure of an electrode for controlling a liquid crystal layer in a liquid crystal display panel in the related art, and will not be described again in the embodiments of the present application.

When the birefringent index of the birefringence structure (i.e., the birefringent index of the liquid crystal layer) is relatively large, the effect of the birefringence phenomenon on the increase of the optical path difference is also relatively large, such that the relatively micro non-uniformity on the substrate may also be observed through the birefringence structure. Therefore, the effect of avoiding the missed detection is achieved.

Optionally, the birefringent index of the liquid crystal may also be affected by a temperature. Therefore, the birefringence structure 12 may further comprise a temperature adjustment assembly 123. The temperature adjustment assembly 123 is configured to adjust a temperature of the liquid crystal layer 121. As such, the birefringent index of the liquid crystal layer 121 can be adjusted by the temperature adjustment assembly 123.

Figure 3:
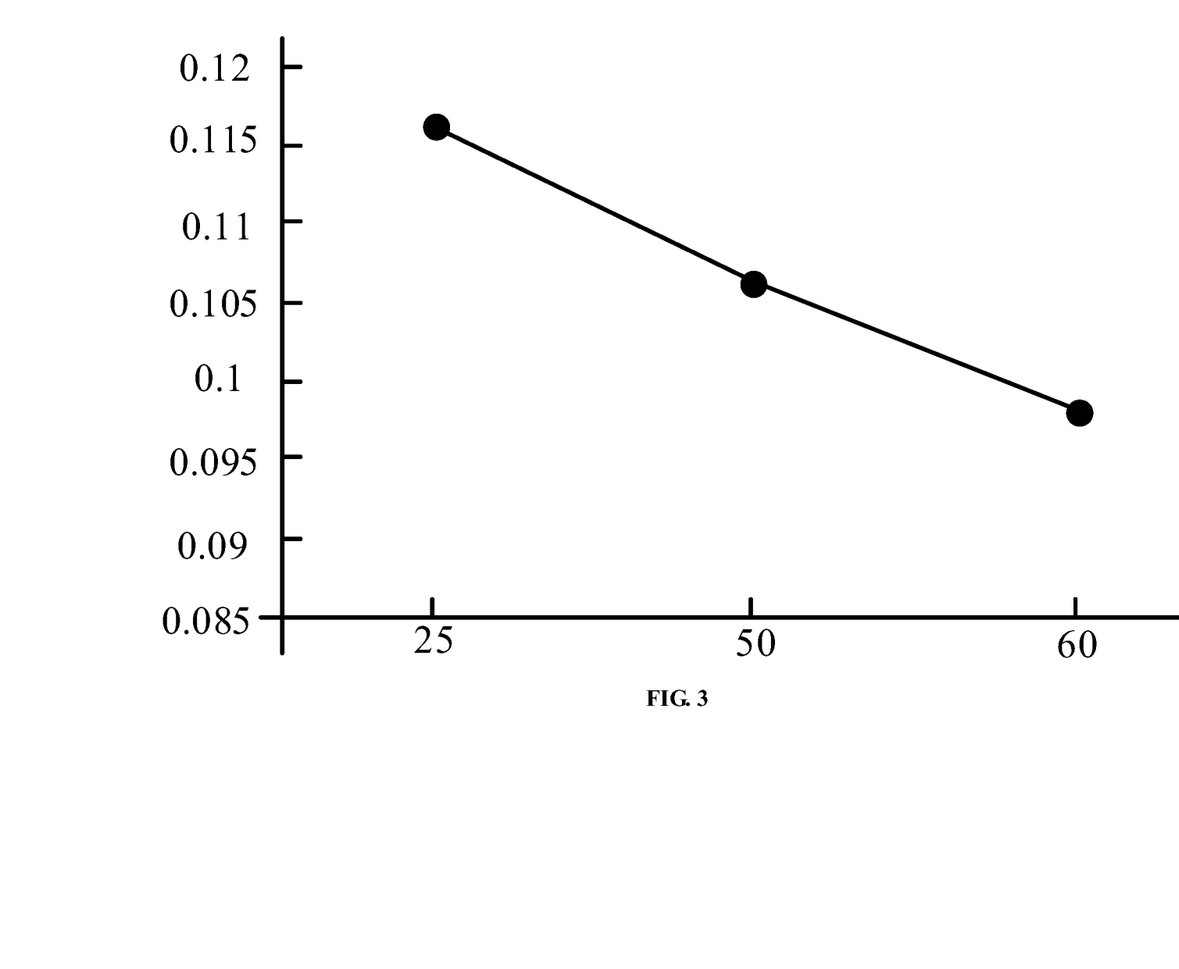
FIG. 3 shows a variation curve of the birefringent index of the liquid crystal as a function of temperature.

FIG. 3 illustrates a variation curve of the birefringent index of the liquid crystal as a function of temperature. As shown in FIG. 3, the horizontal axis represents the temperature with a unit of Celsius, and the vertical axis represents the birefringent index. As can be seen from FIG. 3, the birefringent index of the liquid crystal becomes smaller as the temperature increases. According to this characteristic of the liquid crystal, the adjustable range of the birefringent index of liquid crystal layer may be increased by adjusting the temperature of the liquid crystal layer.

As shown in FIG. 2, the temperature adjustment assembly 123 comprises a transparent graphene heating film which is attached to the liquid crystal layer 121. The entire liquid crystal layer 121 can be heated uniformly through the graphene heating film, such that the uniformity of the birefringent indexes of different regions in the liquid crystal layer may be improved during the process of adjusting the birefringent index of the liquid crystal layer.

In addition, the temperature adjustment assembly 123 may further include a metal heating wire or other transparent temperature control materials, which will not be limited in the embodiments of the present disclosure.

Optionally, the birefringence structure 12 further comprises a color film layer 124 arranged on one side of the liquid crystal layer. The color film layer may be a color film layer of a single color, or may be a color film layer of multiple colors (for example, a color film layer including three color films of red, green, and blue in a ordinary liquid crystal panel). The color film layer arranged in the substrate detection device may facilitate detecting the passing of lights of different colors through the substrate, thereby further expanding the detection range of the substrate detection device.

Optionally, the birefringence structure 12 further comprises a first polaroid 125 arranged on one side, away from the bearing platform 112, of the liquid crystal layer 121. A second polaroid 126 is disposed on the bearing platform 112. The light source 111 is configured to illuminate the substrate to be detected (not shown in FIG. 2) through the second polaroid 126. The first polaroid 125 and the second polaroid 126 are configured to adjust the transmittance of the birefringence structure 12 together with the liquid crystal layer 121. The mode of adjusting the transmittance by the polaroid and the liquid crystal layer may refer to the liquid crystal panel in the related art, and will not be repeated herein Optionally, the light source 111 is a area light source which is arranged on the bearing platform 112. The second polaroid 126 is arranged on the bearing platform 113 on which the area light source is arranged. The substrate to be detected is arranged on one side, away from the light source 111, of the second polaroid 126.

Optionally, the substrate detection device further comprises an image acquisition assembly 13 which is arranged on one side, away from the base platform 11, of the birefringence structure 12. The image acquisition assembly 13 can be configured to acquire an image on one side, away from the base platform 11, of the birefringence structure 12 (this image may be formed by a light emitted from the light source 111 and passed through the birefringence structure 12). After acquiring this image, the image acquisition assembly 13 may determine whether the image meets an eligibility criterion. If this image meets the eligibility criterion, it is determined that the substrate to be detected is an eligible substrate. If this image does not meet the eligibility criterion, it is determined that the substrate to be detected is a defective substrate.

The eligibility criteria for the image may refer that the uniformity level of different regions in the image reaches a predetermined level. The uniformity level of the image may be measured in a plurality of modes. Exemplarily, the variance of the gray level of pixel points in the image may be considered as the uniformity level of the image. The larger the variance, the lower the uniformity level of the image. The smaller the variance, the higher the uniformity level of the image. In addition, other parameters may also be used as measures of the uniformity level of the image, which will not be limited in the embodiments of the present disclosure.

In FIG. 2, a transparent substrate 127 configured to protect the color film layer 124 and the liquid crystal layer 121 may also be arranged between the color film layer 124 and the temperature adjustment assembly 123. A transparent substrate 128 configured to protect the birefringence structure may also be arranged outside the electric field assembly 122.

Optionally, the color film layer 124 may be arranged at a light-outgoing side of the liquid crystal layer 121. Exemplarily, the color film layer 124 may be arranged between the liquid crystal layer 121 and the transparent substrate 127, or the color film layer 124 may be arranged between the transparent substrate 127 and the temperature adjustment assembly 123.

Figure 4:
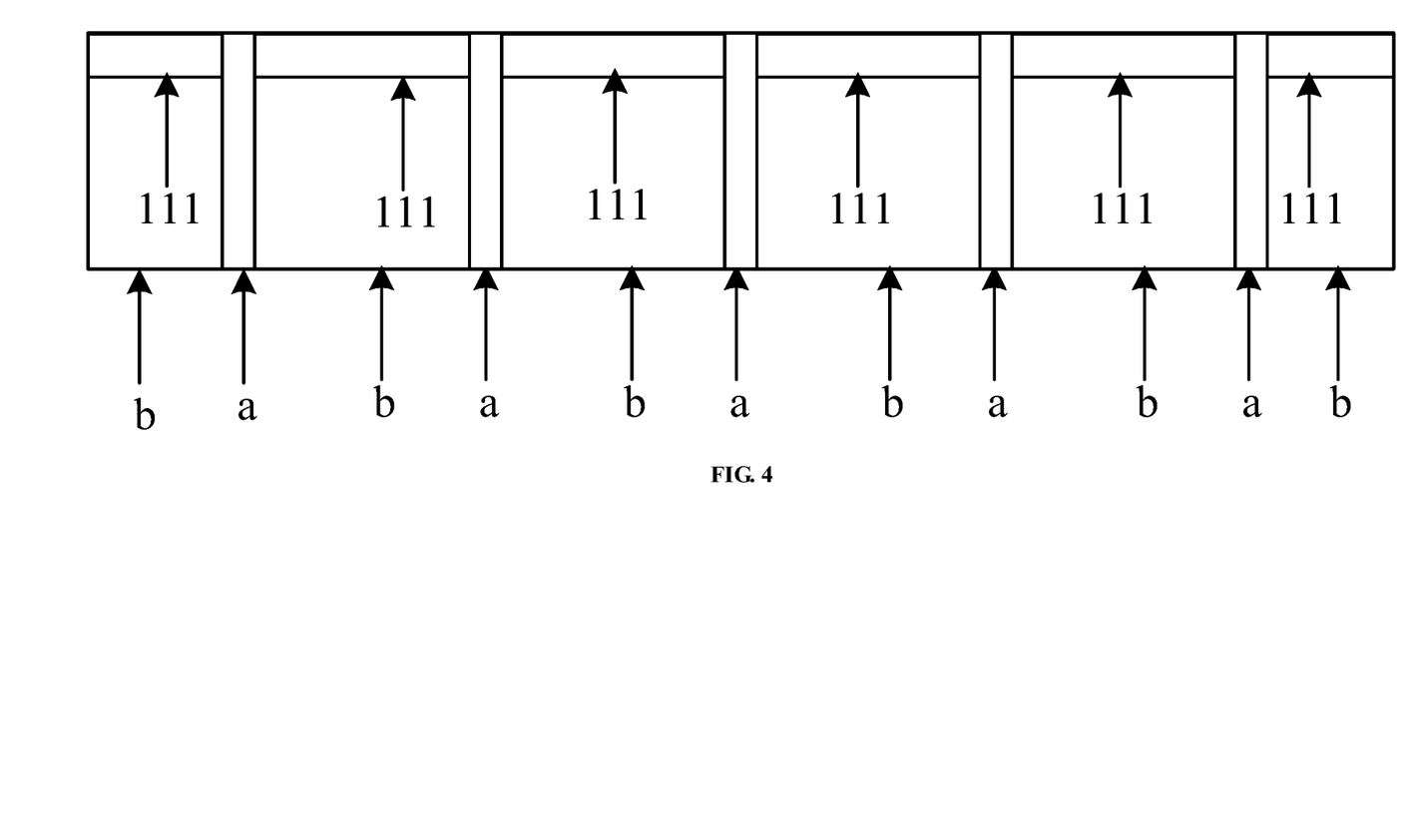
FIG. 4 shows a schematic diagram of a structure of a base platform in the substrate detection device shown in FIG. 2.

FIG. 4 illustrates a schematic structure diagram of a base platform 11 in the substrate detection device shown in FIG. 2. As shown in FIG. 4, the bearing platform 112 in the base platform 11 comprises a supporting portion a and an opening portion b. The supporting portion a is configured to bear the substrate to be detected (not shown in FIG. 4). The opening portion b is configured to allow a light emitted from a light source to illuminate the substrate to be detected through the bearing platform 112.

Optionally, the supporting portion a comprises a plurality of supporting rods. The light source 111 may be arranged among the plurality of supporting rods. As such, the light source 111 may illuminate the substrate to be detected which is arranged on the supporting portion a directly, to avoid the loss of the light caused by the transparent substrate which is supporting the substrate to be detected. Therefore, the efficiency of the light source 111 is improved.

The substrate detection device provided by the embodiment of the present disclosure can intercept a defective substrate before the cell alignment of substrates, thereby avoiding the waste of capacity and materials at the back end, and improving the overall capacity of the display panel.

In summary, the substrate detection device provided by the embodiments of the present disclosure adjusts the birefringent index of the liquid crystal layer by the temperature adjustment assembly. The temperature adjustment assembly is capable of adjusting the birefringent index of the liquid crystal layer together with the electric field assembly. As such, the effect of increasing the adjustable range of the birefringent index of the liquid crystal layer is achieved.

Figure 5:
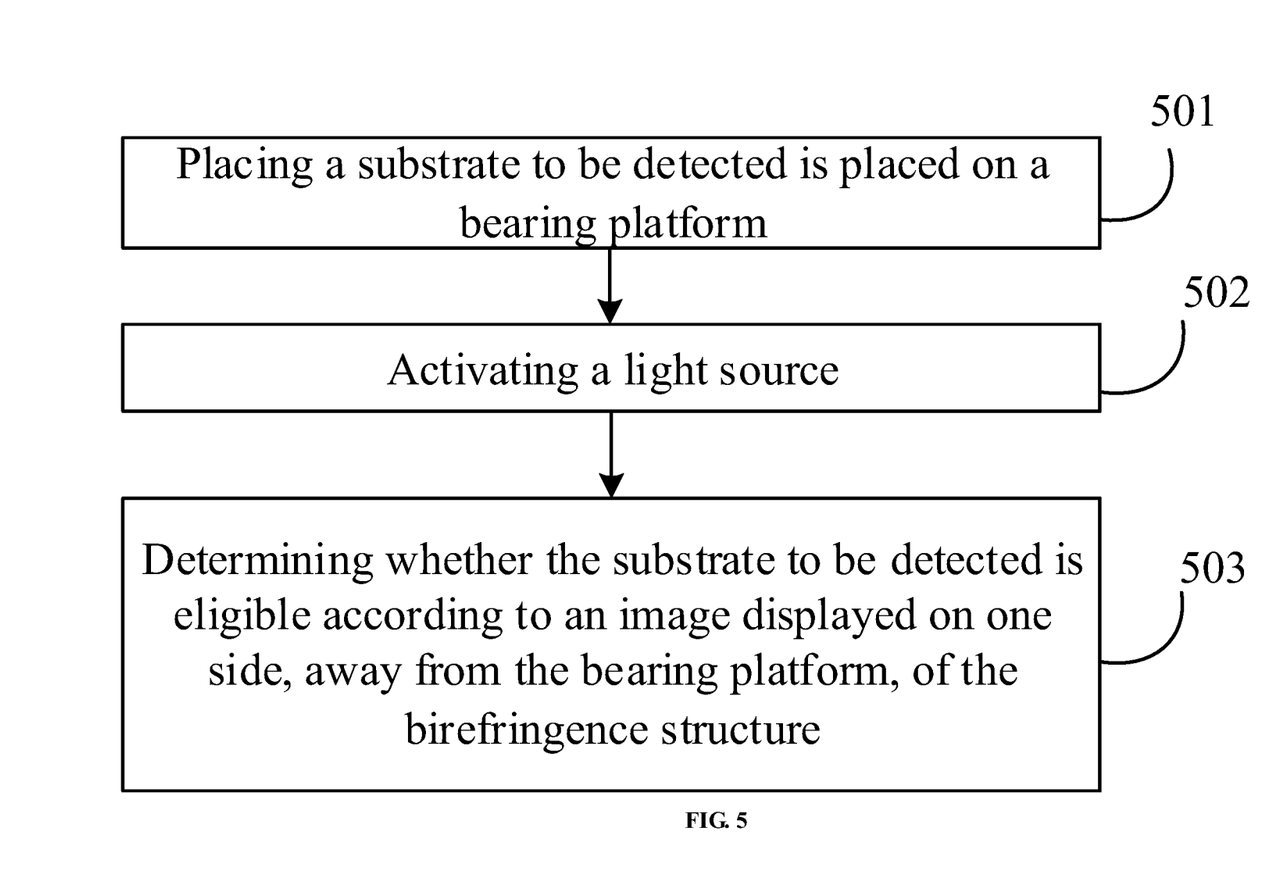
FIG. 5 is a flow chart of a substrate detection method according to an embodiment of the present disclosure.

FIG. 5 is a flow chart of a substrate detection method according to an embodiment of the present disclosure. The method may be used in the substrate detection device shown in FIG. 1 or FIG. 2. The method may include the following steps.

In step 501, the substrate to be detected is placed on the bearing platform.

In step 502, the light source is activated.

In step 503, whether the substrate to be detected is eligible is determined according to an image displayed on one side, away from the bearing platform, of the birefringence structure.

In summary, according to the substrate detection method provided by the embodiments of the present disclosure, the phase difference of the lights is increased by a birefringence structure layer, such that interfere may happens with some lights having a relatively small phase difference. The difference in brightness of different regions on the light-outgoing side of the birefringence structure layer is increased, such that the non-uniformity on the substrate is manifested more easily. The problem that the Mura phenomenon on some substrates to be detected is difficult to be observed in the related art, resulting in large possibility of missed detection, is solved. Therefore, the effect of avoiding the missed detection is achieved.

Figure 6:
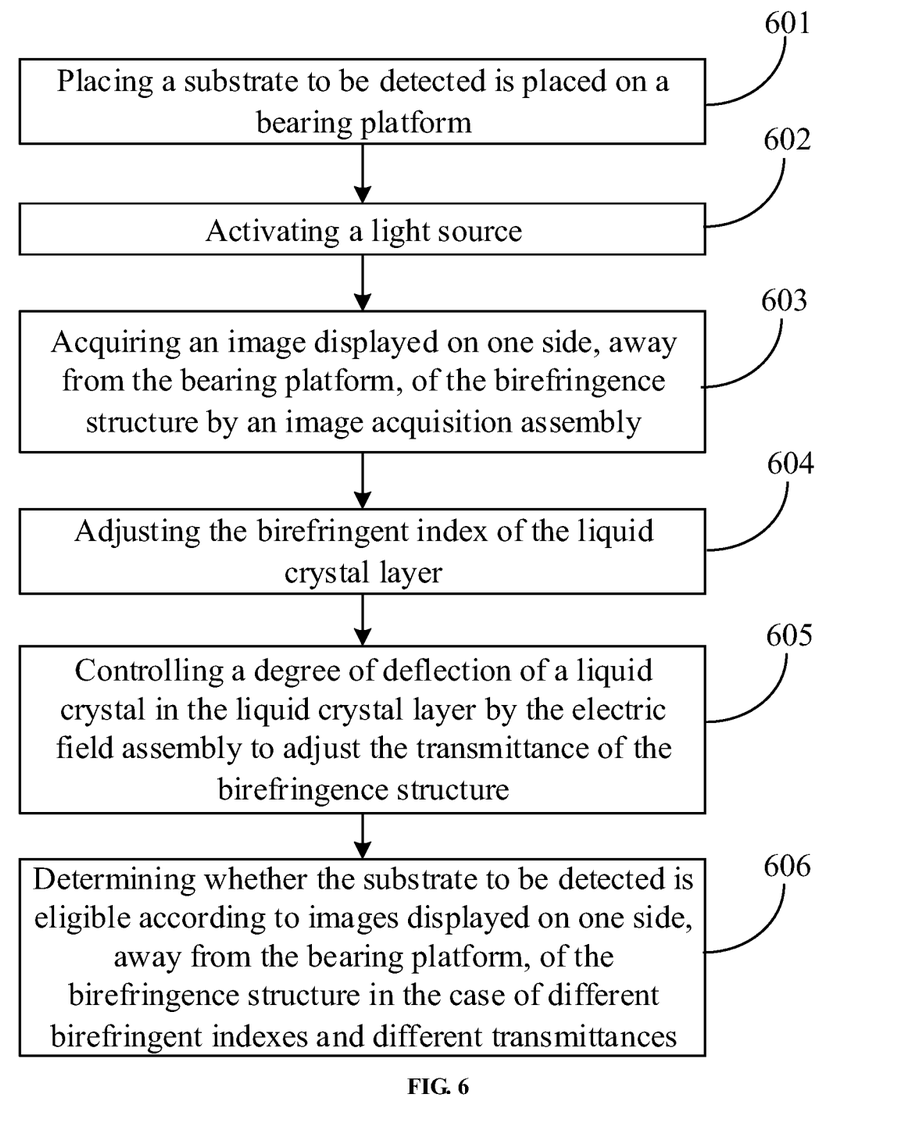
FIG. 6 is a flow chart of another substrate detection method according to an embodiment of the present disclosure and FIG. 7 illustrates a flow chart of a manner for determining whether the substrate to be detected is eligible in the embodiment shown in FIG. 6.

FIG. 6 is a flowchart of another substrate detection method provided by an embodiment of the present disclosure. The method is used for the substrate detection device shown in FIG. 2. The method may comprise the following several steps.

In step 601, a substrate to be detected is placed on a bearing platform.

The substrate to be detected may be various substrates, such as an array substrate, a color film substrate, etc.

The structure of the bearing platform may refer to FIG. 4, and will not be repeated herein.

In step 602, a light source is activated.

The light source may be a area light source. The area light source is arranged on the bearing platform. A second polaroid may also be arranged on the area light source.

In step 603, an image displayed on one side, away from the bearing platform, of the birefringence structure is acquired by an image acquisition assembly.

After the light source is activated, the image displayed on one side, away from the bearing platform, of the birefringence structure may be started to be acquired by the image acquisition assembly. The image is formed on one side, away from the liquid crystal layer, of the first polaroid by allowing lights emitted from the light source to sequentially pass through the second polaroid, the substrate to be detected, the liquid crystal layer and the first polaroid.

In step 604, the birefringent index of the liquid crystal layer is adjusted.

This step may comprise: adjusting the birefringent index of the liquid crystal layer by an electric field assembly, and/or a temperature adjustment assembly.

The mode of adjusting the birefringent index of the liquid crystal layer by the electric field assembly may refer to the content about the electrically controlled birefringence structure in the related art, and will not be repeated here again.

In step 605, a degree of deflection of a liquid crystal in the liquid crystal layer is controlled by the electric field assembly to adjust the transmittance of the birefringence structure.

Polaroid(s) which are cooperated with the liquid crystal layer are arranged on both sides of the liquid crystal layer. The transmittance of the birefringence structure can be adjusted by adjusting the degree of deflection of the liquid crystal in the liquid crystal layer.

In step 606, 6061.

In the step 604 in which the birefringent index of the liquid crystal layer is adjusted and in the step 605 in which the transmittance of the birefringence structure is adjusted, the image acquisition assembly may continuously acquire images displayed on one side, away from the bearing platform, of the birefringence structure, and determine whether the substrate to be detected is eligible according to the acquired images. The determining mode may refer to the embodiment shown in FIG. 2.

Optionally, the image acquisition assembly may determine whether the substrate to be detected is eligible according to the uniformity level of the images displayed on one side, away from the bearing platform, of the birefringence structure.

Figure 7:
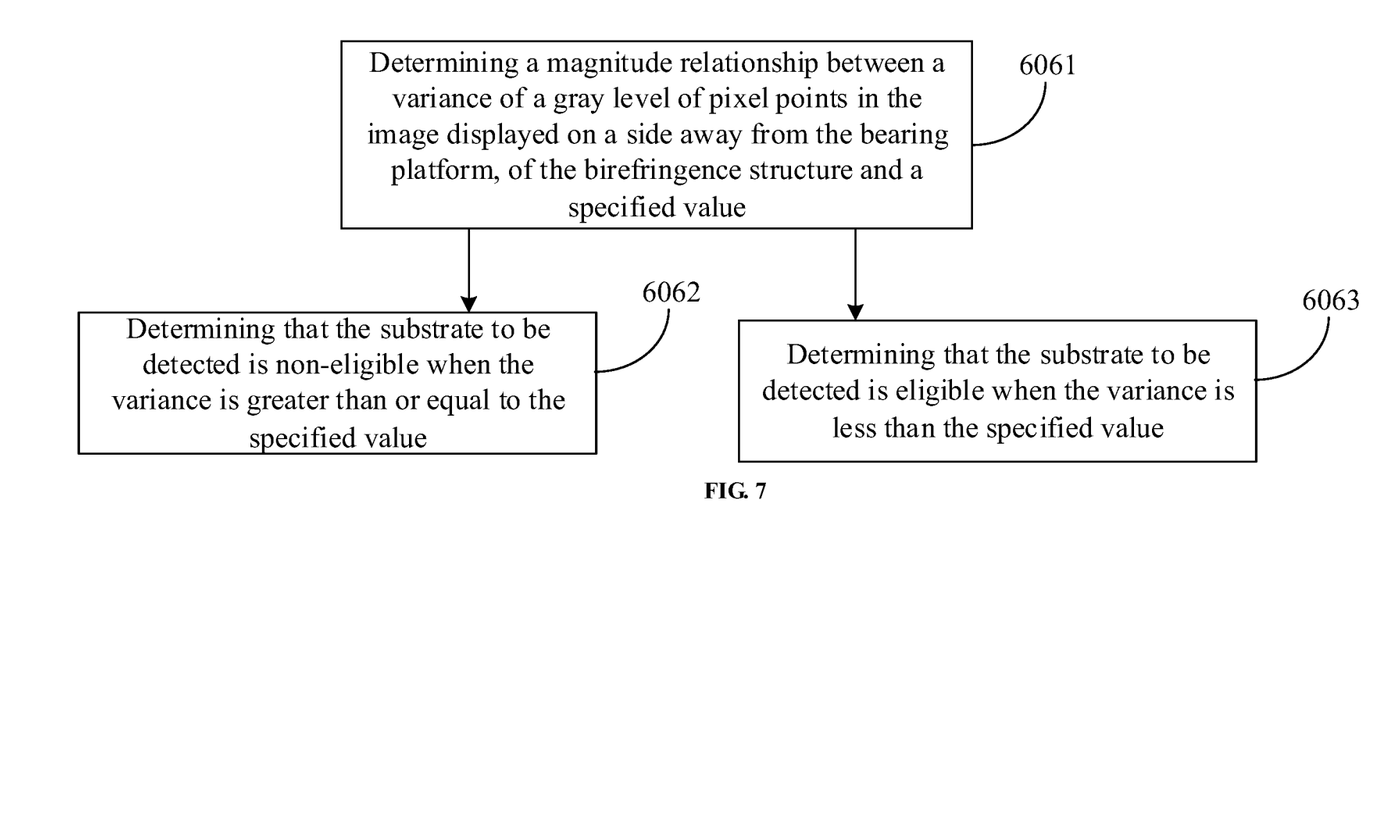

FIG. 7 illustrates a flowchart of a mode for determining whether the substrate to be detected is eligible in the embodiment shown in FIG. 6. As shown in FIG. 7, the determining mode may include:

in substep 6061, a magnitude relationship between a variance of a gray level of pixel points in the image displayed on a side away from the bearing platform, of the birefringence structure and a specified value is determined.

Herein, the specified value may be determined experimentally in advance. A calculation method of the variance may refer to the related art.

In substep 6062, when the variance is greater than or equal to the specified value, it is determined that the substrate to be detected is non-eligible.

When the variance is greater than or equal to the specified value, it is indicated that the dispersion level of the gray level of the pixel points in the image is relatively high, that is, the uniformity level of the image is relatively low, such that the image acquisition assembly may determine that the substrate to be detected is non-eligible.

In substep 6063, when the variance is less than the specified value, it is determined that the substrate to be detected is eligible.

When the variance is less than the specified value, it is indicated that the dispersion level of the gray level of the pixel points in the image is relatively low, that is, the uniformity level of the image is relatively high, such that the image acquisition assembly may determine that the substrate to be detected is eligible.

In summary, according to the substrate detection method provided by the embodiment of the present disclosure, whether the substrate to be detected is eligible is determined according to the uniformity level of the images displayed on one side, away from the bearing platform, of the birefringence structure. When the uniformity level of the images is relatively high, it is determined that the substrate to be detected is eligible. When the uniformity of the images is relatively low, it is determined that the substrate to be detected is non-eligible. Therefore, the standardness and accuracy in detection of the substrate are improved.

"And/or" herein describes the correspondence of the corresponding objects, indicating three kinds of relationship. For example, A and/or B, can be expressed as: A exists alone, A and B exist concurrently, B exists alone. In addition, the character "/" generally indicates that the context object is an "OR" relationship.

Persons of ordinary skill in the art can understand that all or part of the steps described in the above embodiments can be completed through hardware, or through relevant hardware instructed by programs stored in a non-transitory computer readable storage medium, such as read-only memory, disk or CD, etc.

The foregoing descriptions are merely exemplary embodiments of the present disclosure, and are not intended to limit the present disclosure. Any modifications, equivalent substitutions, improvements, etc., made within the spirit and principles of the disclosure shall fall into the protection scope of appended claims of the present disclosure.

What is claimed is:

1. A substrate detection device, comprising:
   a base platform; and
   a birefringence structure,
   wherein the base platform comprises a light source and a bearing platform; the bearing platform is configured to place the substrate to be detected; the light source is configured to illuminate a substrate to be detected from one side, close to the bearing platform, of the substrate to be detected;
   the birefringence structure is on one side, away from the bearing platform, of the substrate to be detected; and
   wherein
   the light source is an area light source;
   the area light source is arranged on the bearing platform;
   the supporting portion comprises a plurality of supporting rods; and
   the light source is arranged among the plurality of supporting rods.

2. The substrate detection device according to claim 1, wherein the birefringence structure comprises a liquid crystal layer and an electric field assembly outside the liquid crystal layer, and
   the electric field assembly is configured to control a birefringent index of the liquid crystal layer.

3. The substrate detection device according to claim 2, wherein the birefringence structure further comprises a temperature adjustment assembly which is configured to adjust the temperature of the liquid crystal layer.

4. The substrate detection device according to claim 3, wherein the temperature adjustment assembly comprises a transparent graphene heating film.

5. The substrate detection device according to claim 4, wherein the graphene heating film is attached to the liquid crystal layer.

6. The substrate detection device according to claim 2, wherein the birefringence structure further comprises a color film layer arranged on one side, away from the bearing platform, of the liquid crystal layer.

7. The substrate detection device according to claim 2, wherein the birefringence structure further comprises a first polaroid arranged on one side, away from the bearing platform, of the liquid crystal layer,
   a second polaroid is arranged on the bearing platform; the light source is configured to illuminate the substrate to be detected through the second polaroid; the first polaroid and the second polaroid is configured to cooperate with the liquid crystal layer to adjust the transmittance of the birefringence structure.

8. The substrate detection device according to claim 1, wherein
   a second polaroid is arranged on a light-outgoing side of the area light source, and the substrate to be detected is placed on one side, away from the area light source, of the second polaroid.

9. The substrate detection device according to claim 1, wherein the bearing platform comprises a supporting portion and an opening portion,
   the supporting portion being configured to support the substrate to be detected;
   the opening portion being configured to allow lights emitted from the light source to illuminate the substrate to be detected through the bearing platform.

10. The substrate detection device according to claim 1, wherein the substrate detection device further comprises a transparent substrate,
    the transparent substrate being arranged on one side, close to the base platform, of the birefringence structure.

11. The substrate detection device according to claim 1, further comprising an image acquisition assembly,
    the image acquisition assembly being arranged on one side, away from the base platform, of the birefringence structure.

12. A substrate detection method for a substrate detection device, wherein the substrate detection device comprises a base platform and a birefringence structure, the base platform comprising a light source and a bearing platform; the bearing platform being configured to place the substrate to be detected; the light source being configured to illuminate the substrate to be detected from one near side, to the bearing platform, of the substrate to be detected; the birefringence structure being located on one side, away from the bearing platform, of the substrate to be detected; and wherein the light source is an area light source; the area light source is arranged on the bearing platform; the supporting portion comprises a plurality of supporting rods; and the light source is arranged among the plurality of supporting rods, and the method comprising the following steps:

placing the substrate to be detected on the bearing platform; and turning on the light source; and determining whether the substrate to be detected is eligible according to image(s) displayed on one side, away from the bearing platform, of the birefringence structure.

13. The method according to claim 12, wherein the birefringence structure comprises a liquid crystal layer and an electric field assembly, and said determining whether the substrate to be detected is eligible according to the image(s) displayed on one side, away from the bearing platform, of the birefringence structure comprises:

adjusting a birefringent index of the liquid crystal layer by the electric field assembly; and determining whether the substrate to be detected is eligible according to images displayed on one side, away from the bearing platform, of the birefringence structure in the case of different birefringent indexes.

14. The method according to claim 13, wherein the birefringence structure further comprises a temperature adjustment assembly, and said adjusting the birefringent index of the liquid crystal layer by the electric field assembly comprises:

adjusting the birefringent index of the liquid crystal layer by the electric field assembly and the temperature adjustment assembly.

15. The method according to claim 13, wherein the birefringence structure further comprises a first polaroid arranged on one side, away from the bearing platform, of the liquid crystal layer; a second polaroid is arranged on the bearing platform; the light source is configured to illuminate the substrate to be detected through the second polaroid; and the method further comprises:

controlling, by the electric field assembly, a degree of deflection of a liquid crystal in the liquid crystal layer to adjust the transmittance of the birefringence structure; and said determining whether the substrate to be detected is eligible according to the images displayed on one side, away from the bearing platform, of the birefringence structure in the case of different birefringent indexes comprises:

determining whether the substrate to be detected is eligible according to images displayed on one side, away from the bearing platform, of the birefringence structure in the case of different birefringent indexes and different transmittances.

16. The method according to claim 12, wherein the substrate detection device further comprises an image acquisition assembly, the image acquisition assembly being arranged on one side, away from the base platform, of the birefringence structure, and after turning on the light source, the method further comprises:

acquiring, by the image acquisition assembly, image(s) displayed on one side, away from the bearing platform, of the birefringence structure.

17. The method according to claim 16, wherein said determining whether the substrate to be detected is eligible according to the image(s) displayed on one side, away from the bearing platform, of the birefringence structure comprises:

determining whether the substrate to be detected is eligible according to a uniformity level of the image(s) displayed on one side, away from the bearing platform, of the birefringence structure.

18. The method according to claim 17, wherein said determining whether the substrate to be detected is eligible according to the uniformity level of the image displayed on one side, away from the bearing platform, of the birefringence structure comprises:

determining a magnitude relationship between a specified value and a variance of a gray level of pixel points in the image(s) displayed on one side, away from the bearing platform, of the birefringence structure;

determining that the substrate to be detected is non-eligible when the variance is greater than or equal to the specified value; and determining that the substrate to be detected is eligible when the variance is less than the specified value.

* * * * *